C. Hesse,
Safety Door.
No. 94,109.   Patented Aug 24, 1869.
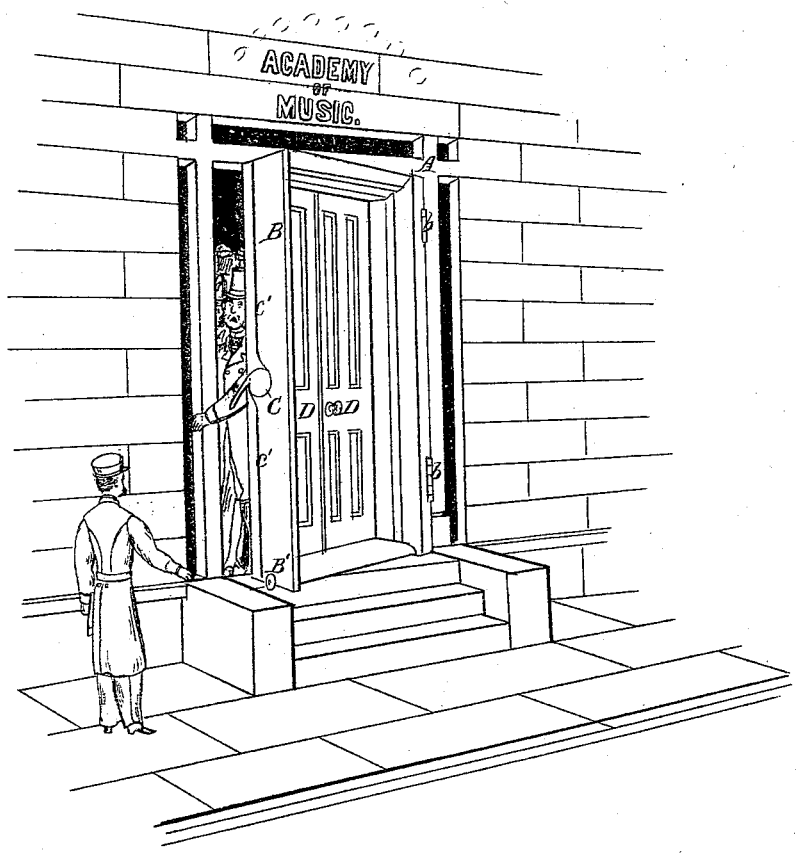
Witnesses.
S. J. Noyes
Fred Thomas
Inventor.
C. Hesse by
J. W. Beadle atty.

United States Patent Office.

CHRISTIAN HESSE, OF CHAMPAIGN, ILLINOIS.

Letters Patent No. 94,109, dated August 24, 1869.

IMPROVED SAFETY-DOOR FOR BUILDINGS.

The Schedule referred to in these Letters Patent and making part of the same.

*To all whom it may concern:*

Be it known that I, CHRISTIAN HESSE, of Champaign, in the county of Champaign, and State of Illinois, have invented a new and useful Improvement in Safety-Doors; and I do declare that the following is a full and exact description of the same, reference being had to the accompanying drawings, and to the letters of reference marked thereon.

This invention is an improvement on that of Alex. H. Wagner, No. 42,719, May 10, 1864, for safety-doors, and consists mainly in certain modifications in the manner of fastening, as will hereinafter more fully appear.

To enable others skilled in the art to make and use my invention, I will now proceed to describe fully its construction and operation, reference being had to the accompanying drawing, showing said invention in perspective.

The parts of the door consist mainly of the hinged casing B and doors D D, and do not differ essentially from that referred to.

The arrangement of the bolts for fastening the hinged casing differs from the other in its arrangement. It consists of the cam C, provided with the bent handle c, and connected with the vertical bolts c' c', one of which extends to the top and the other to the bottom of the casing, the whole being located on the outer edge of the casing, so that when the latter is closed, the locking or bolting arrangement will be out of sight, with the exception of the handle, which projects inward sufficiently far to be easily operated from within. The bolts enter holes in the threshold and frame.

In Wagner's patent, the arrangement of bolts and lever is plainly exposed to view, and presents a somewhat cumbrous and unsightly appearance, besides being more difficult to operate.

Having thus fully described my invention,

What I claim as new, and desire to secure by Letters Patent, is—

The cam-lever C, with handle c and bolts c', when arranged on the edge of the casing of a safety-door, of the described construction, in such manner as to conceal all but the handle, substantially as and for the purpose described.

This specification, signed and witnessed, this 26th day of October, 1868.

CHRISTIAN HESSE.

Witnesses:
 THOS. J. SMITH,
 THOMAS H. HURLICK.